United States Patent

Blessin et al.

[15] 3,680,057

[45] July 25, 1972

[54] DATA COMMUNICATIONS SUBCHANNEL

[72] Inventors: Ronald W. Blessin; James A. Kennedy, both of Phoenix, Ariz.

[73] Assignee: Honeywell Information Systems Inc., Waltham, Mass.

[22] Filed: Nov. 2, 1970

[21] Appl. No.: 86,093

[52] U.S. Cl. .......... 340/172.5
[51] Int. Cl. .......... G06f 13/04
[58] Field of Search .......... 340/172.5

[56] References Cited

UNITED STATES PATENTS

| | | | |
|---|---|---|---|
| 3,569,943 | 3/1971 | Mackie et al. | 340/172.5 |
| 3,059,221 | 10/1962 | Page et al. | 340/172.5 |
| 3,576,570 | 4/1971 | Meier | 340/172.5 |
| 3,528,060 | 9/1970 | Streif | 340/172.5 |
| 3,012,230 | 12/1961 | Galas et al. | 340/172.5 |
| 3,302,185 | 1/1967 | Cox, Jr. et al | 340/172.5 |
| 3,407,387 | 10/1968 | Looschen et al | 340/172.5 X |
| 3,421,147 | 1/1969 | Burton et al. | 340/172.5 |
| 3,559,184 | 1/1971 | Rawlings et al | 340/172.5 |
| 3,564,509 | 2/1971 | Perkins et al. | 340/172.5 |

*Primary Examiner*—Paul J. Henon
*Assistant Examiner*—Sydney R. Chirlin
*Attorney*—Fred Jacob and Edward W. Hughes

[57] ABSTRACT

A data communications subchannel uses input signals and decoding logic to select the baud rate, the length of message characters, the mode of operation and the number of stop bits in a message character used in transmitting binary message characters between a data communications subchannel and a terminal device.

6 Claims, 13 Drawing Figures

INVENTORS
RONALD W. BLESSIN
JAMES A. KENNEDY
BY
Floyd B. Guernsey
AGENT

DATA COMMUNICATIONS SUBCHANNEL

BACKGROUND OF THE INVENTION

The present invention pertains to data communications equipment and more specifically to data communication subchannels which use input signals and decoding matrices to select the baud rate, the length of message characters, the mode of operation and the number of stop bits which are used in the message characters in the data communications equipment.

In the modern business world data communication systems are commonly used to process data which is developed at a plurality of locations that are often spaced many miles, or many hundreds of miles apart. Data at each of these locations may be entered in a data communication system by a terminal device at each of these locations. These terminal devices convert the data from human readable form into binary form and transmit this data over wires or microwave relay systems from the terminal device to a communications controller which receives the data and transfers the received data to a data processor. The terminal devices generate a wide range of message code sets, character lengths, bit rates, message formats, communication line disciplines and modes of transmission (synchronous or asynchronous). The wide variety of these terminal devices and the fact that there is a general lack of standardization of message code sets, character lengths, bit rates, message formats, communication line disciplines and mode of transmission in the industry presents an enormous number of problems to the designer of data communication equipment. The data communications equipment must be designed to interface with a wide variety of different types of these terminal devices and should be constructed so that additional devices can be added or the terminal devices connected to the data communication systems can be changed at the desire of the customer.

It is desirable to provide a communications controller which is sufficiently flexible to be connected to a wide variety of types of terminal devices having a wide variety of speeds of transmission of message characters or baud rates, different size of message characters, and different modes of transmission. Many prior art systems are designed in modular form with each of the many available modular options intended to interface with a limited and specific type of terminal device. Each of the modules provides compatibility with a specific terminal device or with a family of terminal devices. Once a customer's configuration is known, the appropriate optional modules can be connected to a common control module in the data communication system. This use of optional modulus requires a design of, and a capability of manufacture, testing and maintaining a number of different types of line modules. The hardware in each line module may be different so that it is not possible to use common logic to perform functions which differ among the various line modulus, and efficiency of design may be sacrificed.

Other prior art systems may use switches, patch plugs or boards and/or wiring options so as to permit custom configuration of the hardware or hardware modules to obtain compatibility with various terminal devices. Thus, the specific configuration of terminal devices in the field would be different and will probably be in a continual state of flux due to changing customer requirements. This changing of plug boards and hardware modules creates problems in maintaining the data communication system in various customer installations and in creating software for the purpose of testing and diagnosing the data communication system. It is very difficult to construct a comprehensive, yet invariant software test package, for a system which has many possible configurations and in which the configurations may change from time to time. Hence, it is often necessary to customize the test and diagnostic package for each of the customer sites initially, and then make further changes each time the system is changed or reconfigured.

The instant invention overcomes a disadvantage of the prior art by providing a data communications subchannel which uses a plurality of input signals and decoding logic to select a baud rate of the message characters, to determine if synchronous or asynchronous transmission is to be used, to determine the size of the message characters which can be used, and to determine the number of stop bits used in the message characters. When terminal devices at the end of the transmission line are changed the signals which are used to control the subchannel can be changed to cause the baud rate to be changed, to cause the length of the message characters to be changed, to change the mode of transmission from synchronous to asynchronous, or to change the number of stop bits used in the message character. This means that a large variety of terminal devices can be accommodated by the data communication system and that these devices can be changed without any change of hardware in the system. All that is required is that new signals be used to reconfigure the data communications subchannel.

It is therefore an object of this invention to provide a new and improved data communication subchannel for using input signals to select the size of message characters which may be received by the subchannel.

Another object of this invention is to provide a new and improved data communication subchannel for using input signals to select the size of message characters which the subchannel may send to a terminal device.

A further object of this invention is to provide a new and improved data communication subchannel for using input signals to select the baud rate of message characters which may be used in the subchannel.

A still further object of this invention is to provide a new and improved data communication subchannel for using input signals to select the number of stop bits which may be used in the message characters used in the subchannel.

Another object of this invention is to provide a new and improved data communication subchannel for using input signals to select the mode of operation of the subchannel.

SUMMARY OF THE INVENTION

The foregoing objects are achieved in accordance with one embodiment of the present invention by employing a data communications subchannel that utilizes input signals and decoding logic to select the baud rate, the length of message characters, the mode of operation and the number of stop bits in message characters used in transmitting binary message characters between a data communication subchannel and a terminal device. These input signals may be supplied by a communications controller under the control of a program from the data processor. When it is desired that a different baud rate, a different number of stop bits, or a different mode of operation was used, the program in the data processor may change the input signals which are supplied to the subchannel.

Other objects and advantages of this invention will become apparent from the following description when taken in connection with the accompanying drawings.

DESCRIPTION OF THE PREFERRED EMBODIMENT

Since the present invention pertains to data processing and to data communication techniques, a description thereof can become very complex; however, it is believed unnecessary to describe all of the details of the data communications system to completely describe the present invention. Therefore, most of the details that are relatively well known in the art will be omitted from this description. Even though details will be eliminated a basic description will be given of the entire system to enable one skilled in the art to understand the environment in which the present invention is placed. Accordingly, reference is made to FIG. 1 showing a simplified block diagram of a data communications system which uses the present invention.

Figure 1:
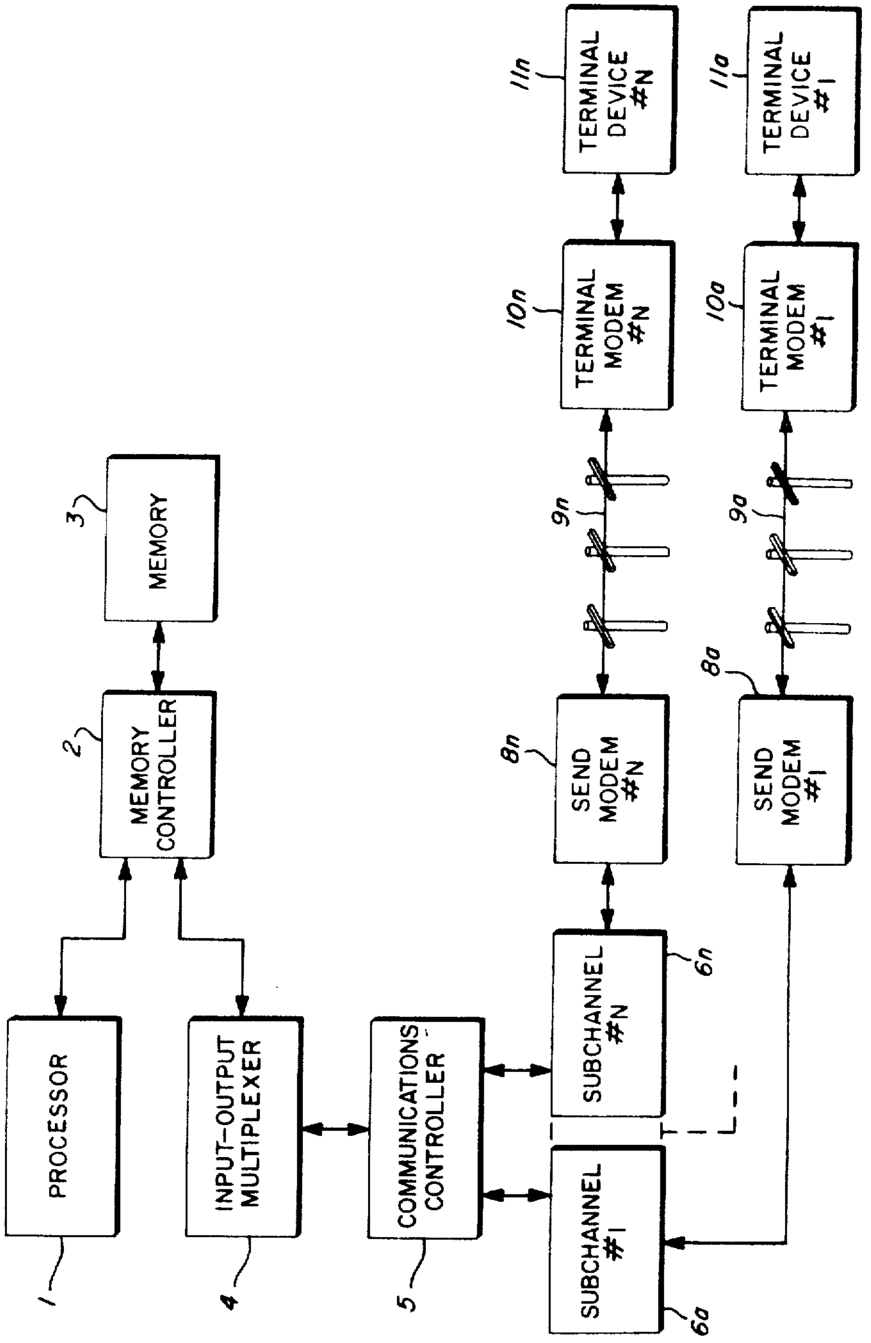
FIG. 1 is a simplified block diagram of a data communications system in which the present invention may be used.

The data communications system shown in FIG. 1 includes a data processor 1, a memory controller 2, a memory device or memory 3, an input/output multiplexer 4, a communications controller 5 having a plurality of subchannels **6*a*–6*n*, and a plurality of terminal devices 11*a*–11*n*. The data processor 1 shown in FIG. 1 manipulates data in accordance with the instructions of a program which may be stored in memory. The processor receives an instruction, decodes the instruction and performs the operation indicated thereby. The operation is performed upon data received by the processor and temporarily stored thereby during the operation. The series of instructions are called a program and include decodable operations to be performed by the processor. The instructions of the program are obtained sequentially by the processor and together with the data to be operated upon, are stored in the memory device. The memory device 3 shown in FIG. 1 may form many of several well known types; however, most commonly the main memory is a random access coincident current type having a plurality of discrete addressable locations each of which provides storage for a word. The word may form data or instructions and may contain specific fields useful in a variety of operations. Normally, when the processor is in need of data or instructions it will generate a memory cycle and provide an address to the memory. The data or words stored at the address location will subsequently be retrieved from memory and provided to the data processor 1**.

A series of instructions comprising a program is usually "loaded" into the memory at the beginning of the operation and thus occupies a "block" of memory which normally must not be disturbed until the program has been completed. Data to be operated upon by the processor in accordance with instruction of the stored program is stored in memory and is retrieved and replaced in accordance with binary coding instructions.

Communications with the data processing system usually takes place through the media of input/output devices such as magnetic tape handlers, paper tape readers, punch card readers, and remote terminal devices. To control the receipt of information from input/output devices and to coordinate the transfer of information to and from such devices, an input/output control means is required. Thus an input/output controller or input/output multiplexer is provided and connects the data processing system to the variety of input/output devices. The input/output multiplexer coordinates the information flow to and from the various input/output devices and also awards priority when more than one input/output device is attempting to communicate with the data processing system. Since input/output devices are usually electro-mechanical in nature and necessarily have operating speeds which are much lower than the remainder of the data processing system, the input/output multiplexer provides buffering for temporary storage to enable the processing system to proceed at its normal rate without waiting for the time consuming communication with the input/output device.

Binary information which may be supplied from the memory to one of the subchannels **6*a*–6*n*, is converted by one of the send modems 8*a*–8*n* into modulated information which may be sent over telephone lines 9*a–n* to one of the terminal modems 10*a*–10*n*. A terminal modem converts the modulated information into binary information for use by a corresponding one of the terminal devices 11*a*–11*n*. Binary information which is generated by one of the terminal devices 11*a*–11*n* is converted by one of the terminal modems 10*a*–10*n* into modulated information which is sent over the telephone lines to a corresponding send modem 8*a*–8*n*, which converts modulated information into binary information again for use by a corresponding one of the subchannels 6*a*–6*n***. The send modems and the terminal modems may either receive modulated information and convert the modulated information into binary information or they may receive binary information and convert it into modulated information.

The input/output multiplexer shown in FIG. 1 may have a plurality of input/output devices connected to the input/output multiplexer or input/output controller in the same manner as FIG. 1 of U.S. Pat. No. 3,413,613 by Bahrs et al. The communications controller 5 shown in applicant's FIG. 1 appears to the input/output multiplexer 4 to be an input/output device, but this communications controller in turn controls a plurality of subchannels which may be connected through modems and telephone lines to terminal devices.

For a complete description of the processor of FIG. 1 and the instant invention which is embodied in such a processor, reference is made to the above U.S. Pat. No. 3,413,613 issued to David L. Bahrs et al. Memory device 3 may be of the type disclosed in a copending application by David L. Bahrs, John F. Couleur, and Albert L. Beard entitled "Synchronous Control Apparatus for a Multiprogram Data Processing System" bearing Ser. No. 710,996 and filed on Mar. 6, 1968, now U.S. Pat. No. 3,521,240. A more complete description of the operation of a data communications system is disclosed in a copending application by James A. Kennedy, Aldis Klavins, and Robert J. Koegel entitled "Data Communications System," bearing Ser. No. 50,792 and filed on June 29, 1970. A portion of one of the subchannels **6*a*–6*n*** is shown in more detail in FIGS. 2–5.

AND-Gates

The AND-gates disclosed in the drawings and particularly in FIGS. 2–5 provide the logical operation of conjunction for binary signals applied thereto. In the system disclosed, since the binary one is represented by positive signal, the AND-gates provide a positive output signal representing a binary one when, and only when, all of the input signals applied thereto are positive and represent binary ones. The symbol identified by the numeral 68 in FIG. 2 represents a two input AND-gate. Such AND-gates deliver a binary one output signal only when each of the two input signals applied thereto represent a binary one. A three-input AND-gate, such as represented by AND-gate 67 of FIG. 3, delivers a binary output only when each of the three input signals represents a binary one.

OR-Gates

The OR-gates disclosed in FIGS. 2–5 provide a logical operation of inclusive OR for binary input signals applied thereto. In the system, since the binary one is represented by positive signals, the OR-gate provides a positive output signal representing a binary one when any one or more of the input signals applied thereto are positive and represent binary ones. The symbol identified by the numeral 50 in FIG. 2 represents a two-input OR-gate. This OR-gate delivers a binary one output when any one or more of its input signals applied thereto represent a binary one. An eight-input OR-gate, such as represented by gate 16, delivers a binary output signal when any one or more of its input signals applied thereto represent a binary one.

Exclusive-OR Gate

The exclusive-OR gate disclosed in FIG. 3 provides a positive output signal representing a binary one when any one and only one of the input signals applied thereto are positive and represent a binary one. The symbol identified by the numeral 72 in FIG. 3 represents a two-input exclusive-OR gate. This gate delivers a binary one output when either one and only one of its input signals applied thereto represent a binary one. When both input signals represent a binary zero this gate delivers a binary zero at the output lead. When both input signals represent a binary one this gate also delivers a binary zero at the output lead.

Inverters

The inverter disclosed in FIG. 2 and represented by numeral 18 provides a positive output signal representing a binary one when the input signal applied thereto has a zero value of voltage, representing a binary zero. Conversely, the inverter provides an output signal representing a binary zero when the input signal represents a binary one.

NAND-Gate

The NAND-gates disclosed in the drawings and particularly in FIGS. 2–5 provide the function of an AND-gate followed by an inverter. The symbol identified by gate 20 in FIG. 2 represents a three-input NAND-gate. This NAND-gate delivers a binary zero output when, and only when, all of the input signals applied thereto are positive and represent binary ones. Such NAND-gates deliver a binary one output signal when any of the input signals represent a binary zero.

NOR-Gates

The NOR-gate disclosed in FIG. 5 provides the operation of an OR-gate followed by an inverter. The symbol identified by the numeral 156 in FIG. 5 represents two-input NOR-gates. This NOR-gate delivers a binary zero output signal when any one or more of its input signals supplied thereto represent a binary one. Such NOR-gates deliver a binary one output signal only when each of the two input signals applied thereto represent a binary one.

Flip-Flop

The flip-flops or bistable multi-vibrators referred to in the specification, and shown, for example, in FIG. 2 of the drawings, and circuits adapted to operate in either one of two stable states and to transfer from the state in which they are operating to the other stable state upon the application of a trigger signal thereto. In one state of operation, the flip-flop represents a binary one (1-state) and in the other state the binary one (0-state). The three leads entering the left side of the flip-flop symbol, for example, flip-flop number 36, shown in FIG. 2, provides the required trigger signals. The upper lead, the J lead, provides the set signal, the lower lead, the K lead, provides the reset input signal and the center lead provides the trigger signal. When this set input signal on the J lead, is positive and the reset signal, on the K lead, is zero, a change from a positive voltage to a zero value voltage, on the C lead, causes the flip-flop to transfer to the 1-state, if it is not already in the 1-state. When the reset signal is positive and the set signal is zero, a change from a positive voltage to a zero value of voltage, on the C lead, causes the flip-flop to transfer to the 0-state if it is not already in the 0-state. The R lead entering the bottom of the flip-flop also provides reset signals. When a zero voltage potential is applied to the R lead, the flip-flop resets to the O-state and remains in the O-state as long as a zero voltage potential remains on the R lead, irrespective of any signals on the J, C and K leads. Some flip-flops do not provide the R lead. The S lead entering the top of the flip-flop also provides set signals. When a zero voltage potential is applied on the S lead, the flip-flop sets to the 1-state and remains in the 1-state as long as the zero voltage potential remains on the S lead, irrespective of any signals on the J, C and K leads. Some flip-flops do not provide the S lead. The flip-flop represented by the numeral 54 (FIG. 2) illustrates a flip-flop which does not have an S lead and an R lead but has no connection to the J, C and K leads. The two leads leaving the right hand side of the flip-flops deliver the output signals for each flip-flop. The upper output leads, the Q leads deliver the 1-output signal of the flip-flop and the $\overline{Q}$ output leads, deliver the 0-output signals.

Before data can be transferred between the subchannel and the terminal device in a data communications system, the subchannel must be configured in either a synchronous mode or asynchronous mode, and the "code level" or number of bits in each character must be specified. If the subchannel is configured in a synchronous mode the sync character must be specified. If the subchannel is configured in an asynchronous mode, the baud rate and the number of stop bits must be specified. In addition the subchannel must be configured in either a receive mode or a send mode, or both.

Figures 2A, 2C:
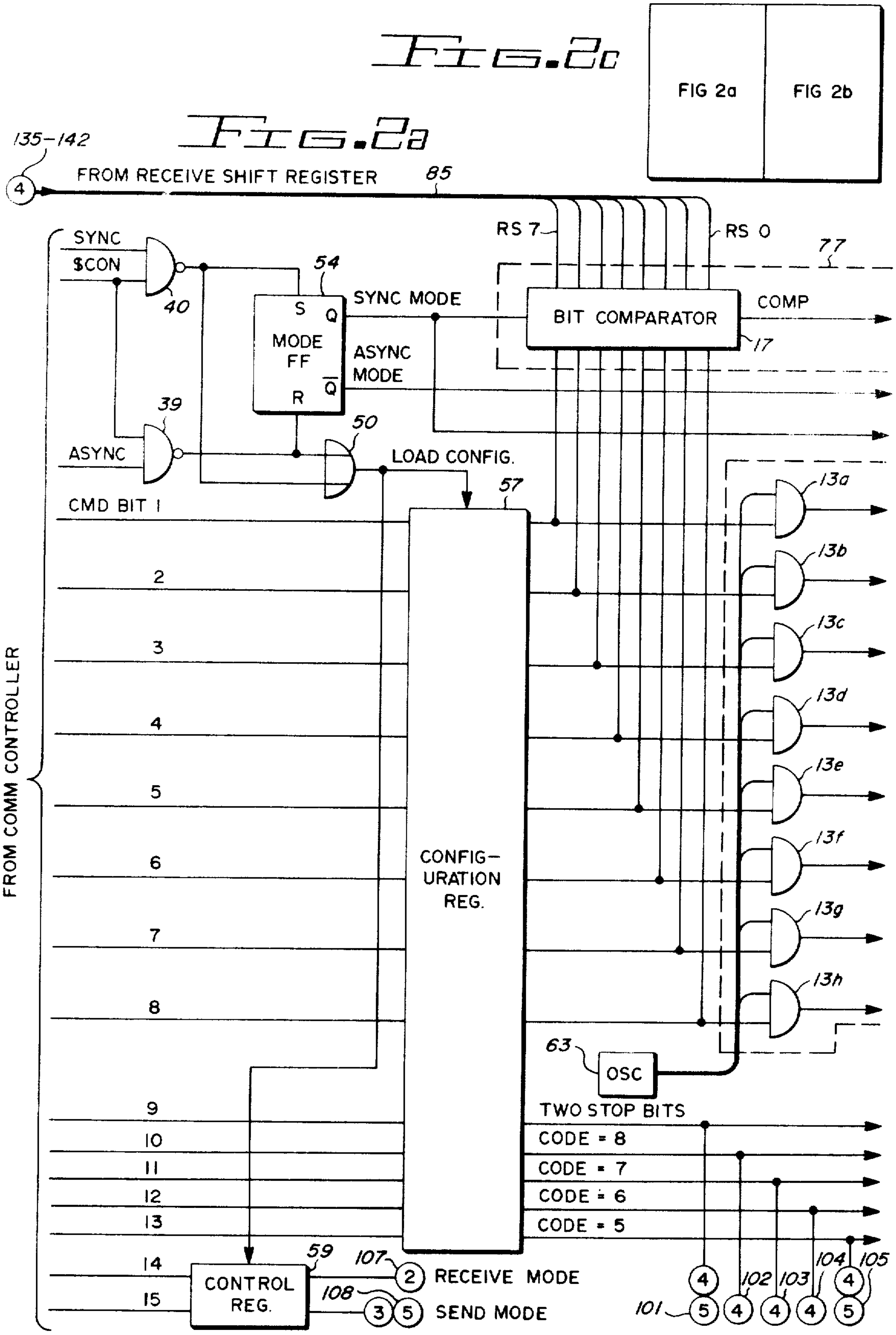
FIGS. 2*a* and 2*b*, 3*a* and 3*b*, 4*a* and 4*b*, and 5*a* and 5*b* when joined in the manner indicated in FIGS. 2*c*, 3*c*, 4*c*, and 5*c*, respectively, comprise a simplified block diagram of a portion of a communications controller subchannel constructed in accordance with the teaching of the present invention.
Figure 2B:
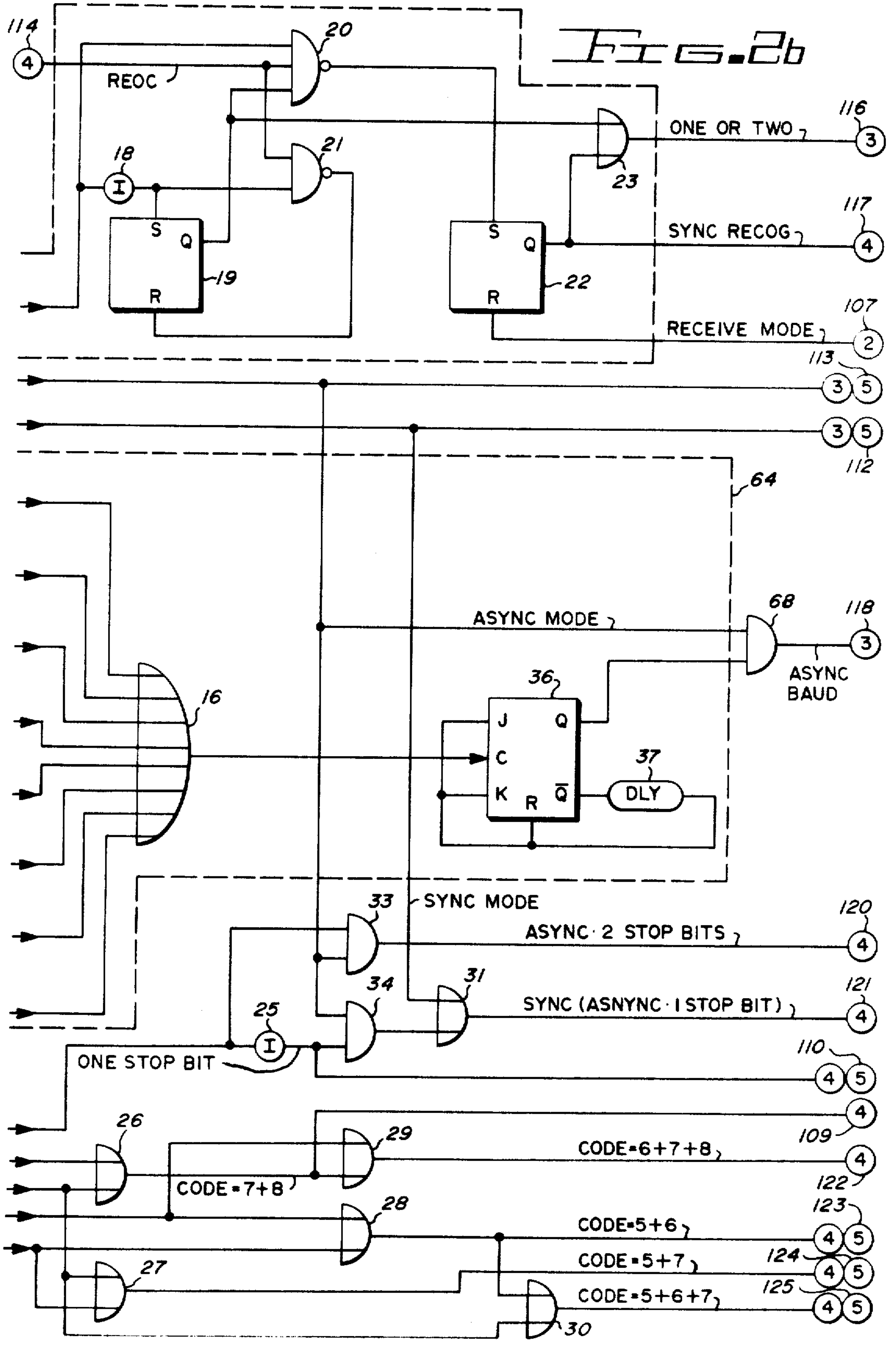
Figures 3A, 3C:
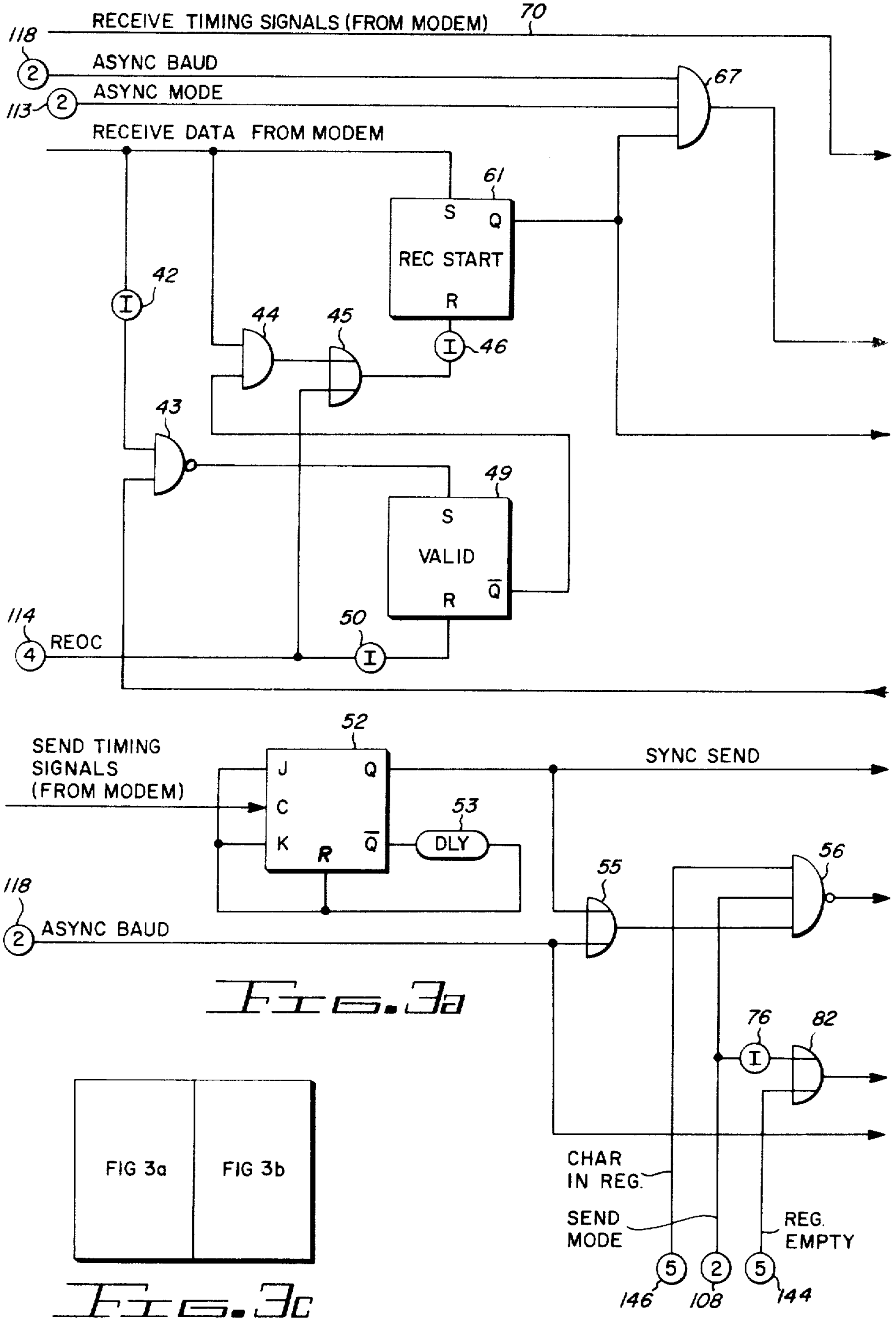
Figure 3B:
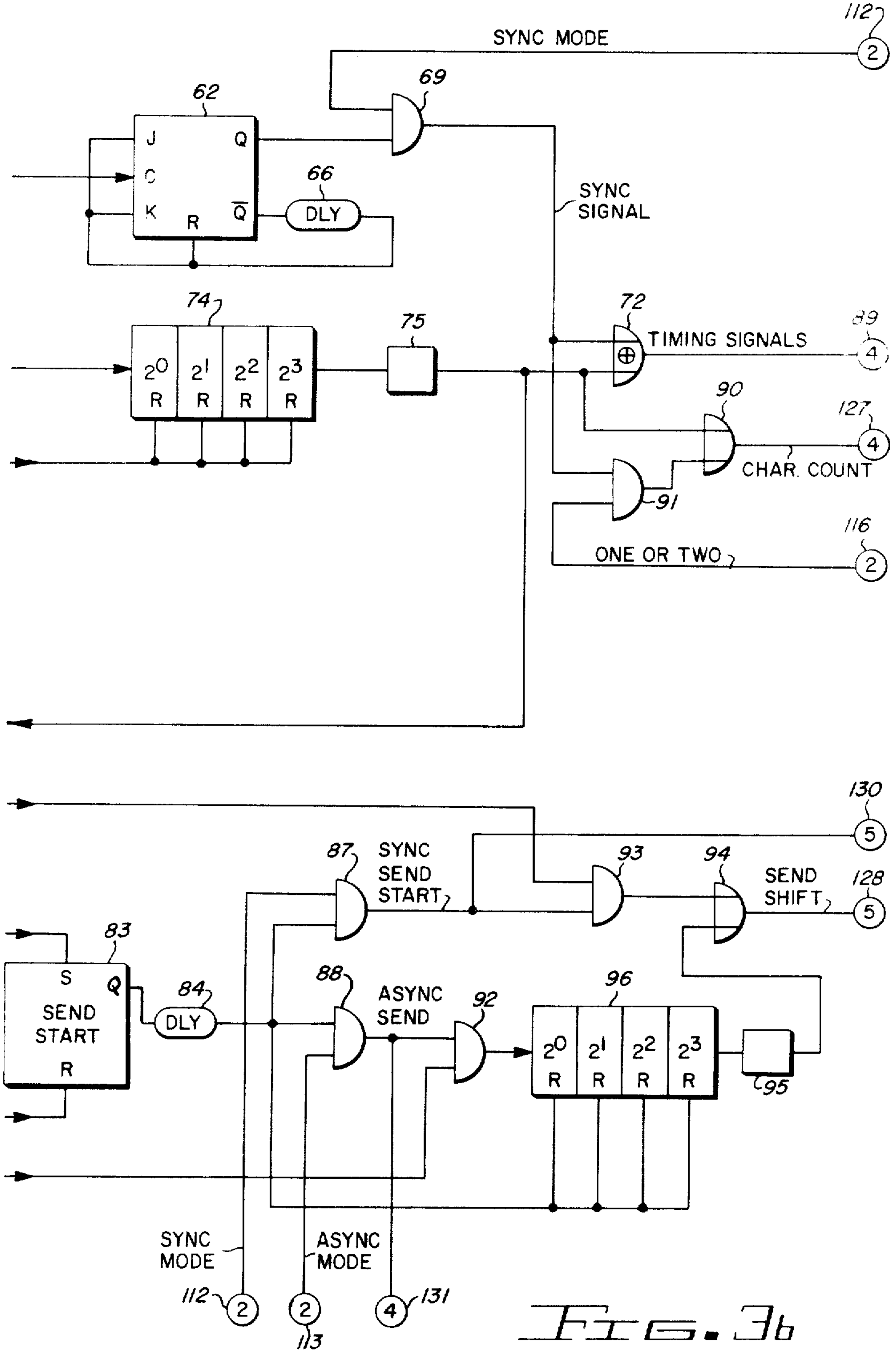
Figures 4A, 4C:
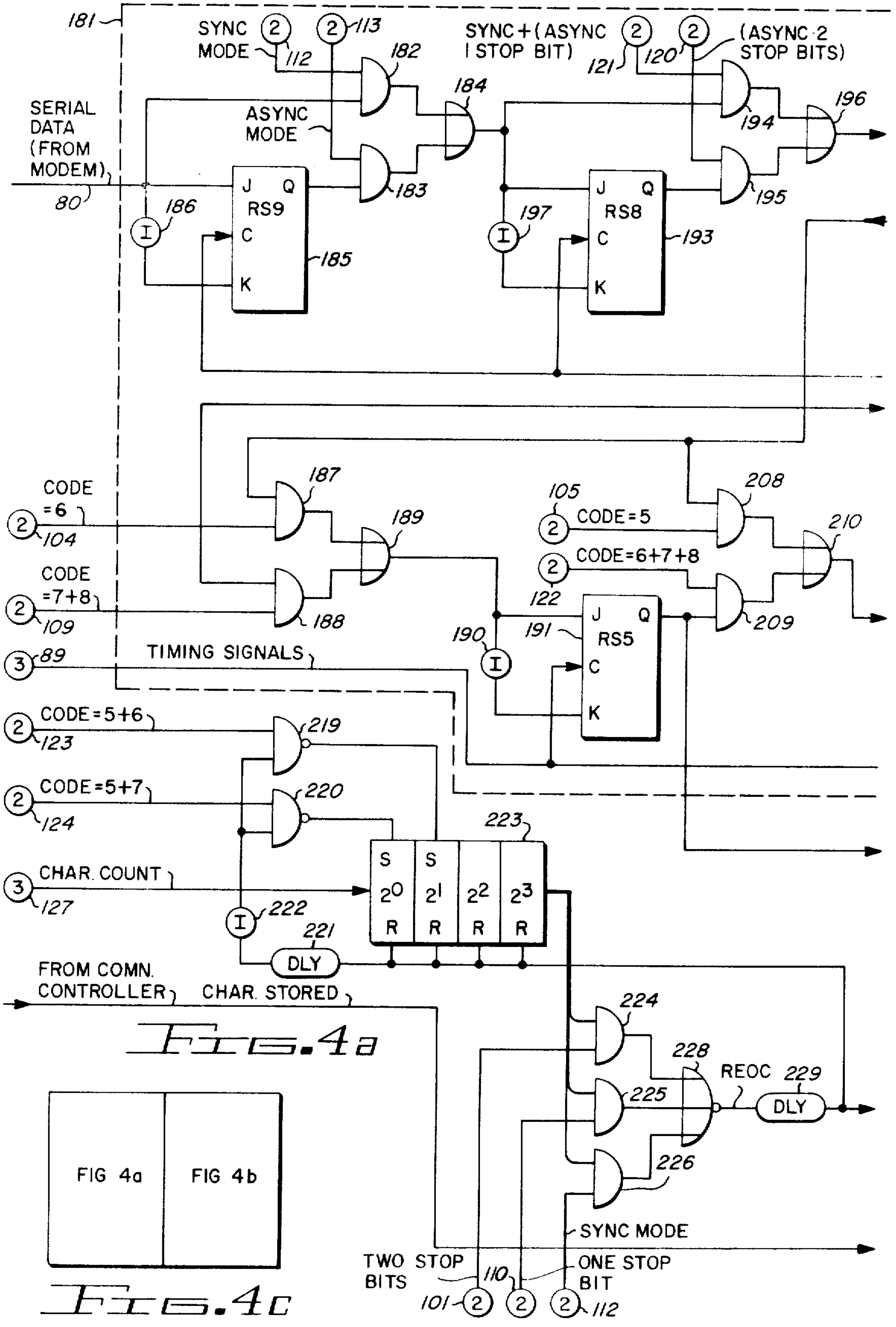
Figure 4B:
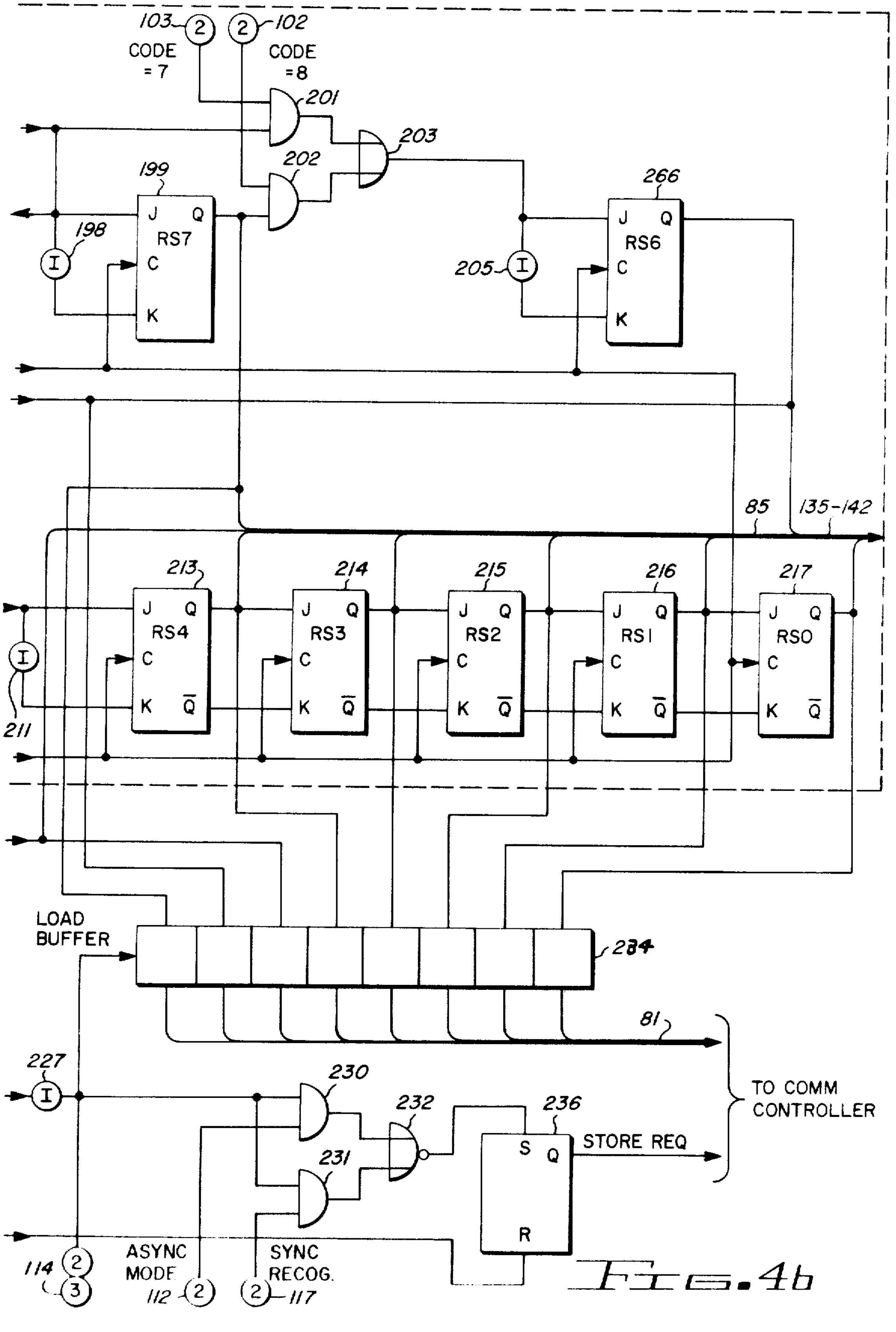
Figure 5A:
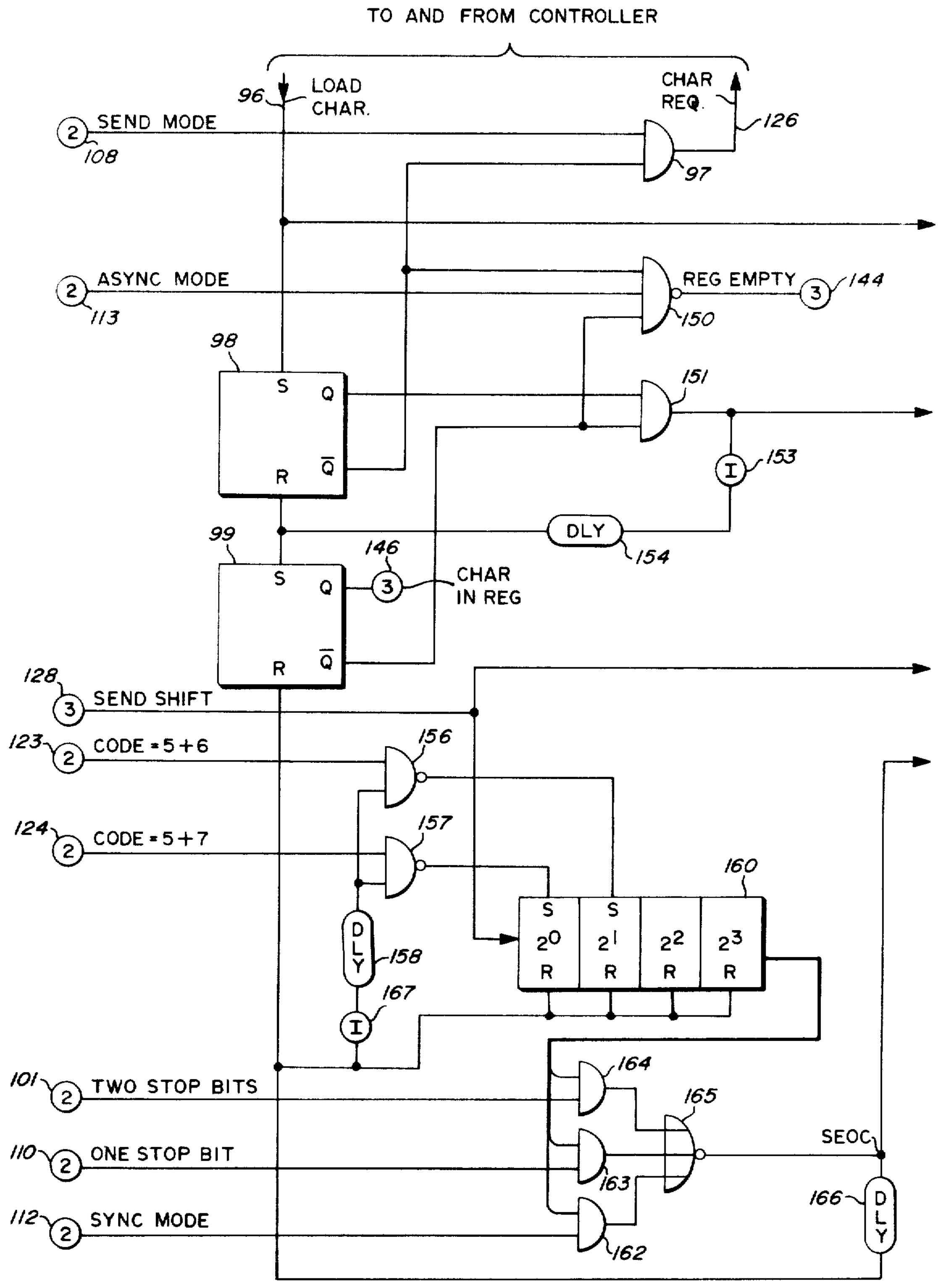
Figures 5B, 5C:
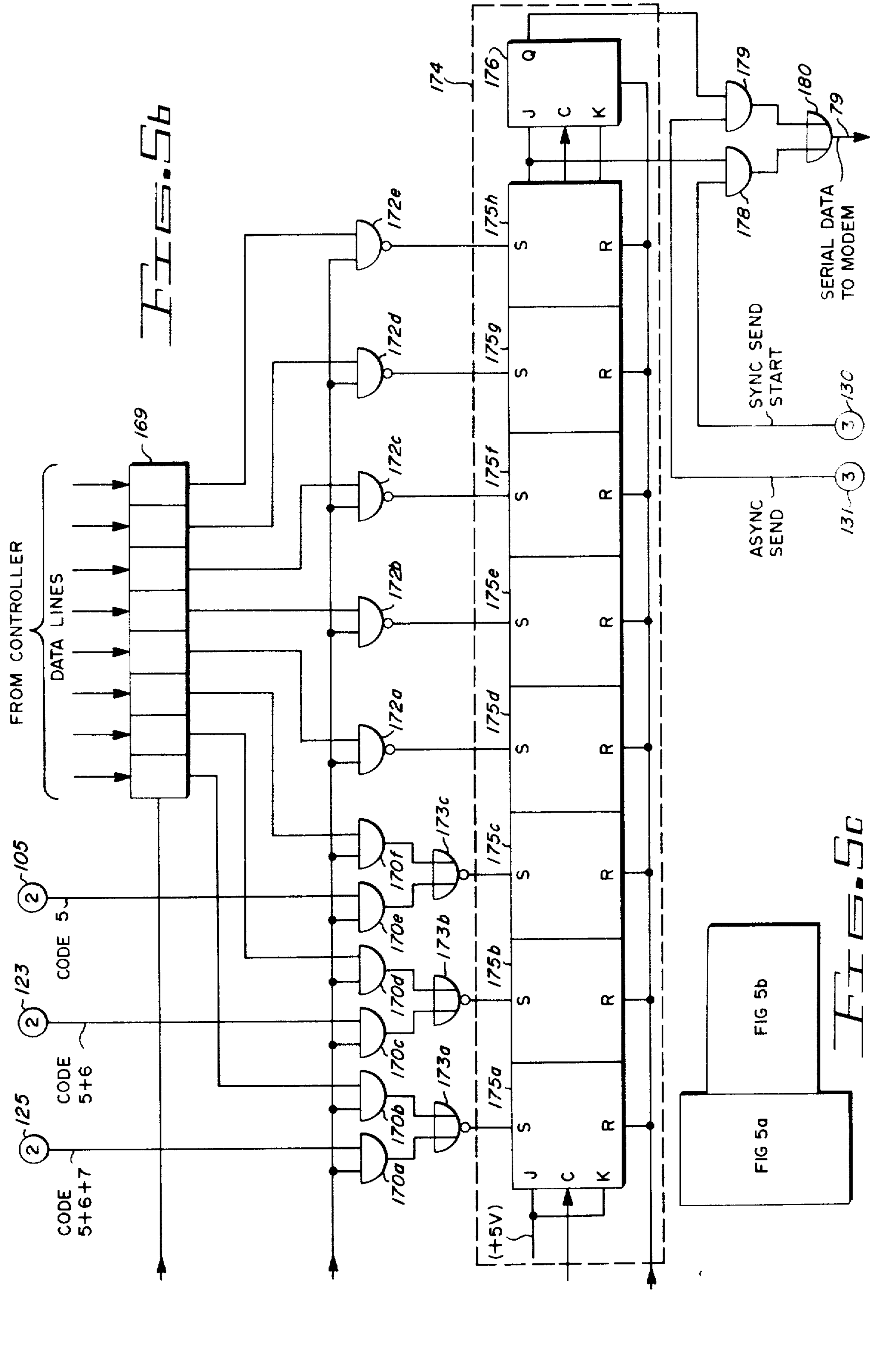

Signals from the communications controller are received by the subchannel and used to generate control signals which are used by the subchannel for controlling the sending and receiving of data from the terminal devices. These signals from the controller include command bits 1–15 which are applied to the configuration register and to the control register shown in FIG. 2a and the SYNC, ASYNC, and $CON signals which are applied to control the mode of operation of the subchannel. The portion of the subchannel shown in FIG. 2 utilizes these control signals to develop additional control signals which are utilized in other portions of the subchannel. The leads or terminals which contain the control signals are numbered with a code which facilitates the locating of these signals in other portions of the subchannel. The terminals are labeled with a figure number corresponding to the figure of the drawing where the signal is sent and the terminal is also numbered. For example, the SEND MODE signal from the control register 59 (FIG. 2a) is coupled to FIGS. 3 and 5 as shown by the 3 and 5 at the terminal 108. In FIGS. 3 and 5 the terminals which have the SEND MODE signal will be labeled with the numeral 108. FIGS. 2, 3, 4 and 5 together illustrate a portion of a subchannel. FIGS. 2a and 2b are drawn to be placed side by side as shown in FIG. 2c. Leads from the right side of FIG. 2a are connected to the leads from the left side of FIG. 2b. FIGS. 3a and 3b are drawn to be placed side by side as shown in FIG. 3c; FIGS. 4a and 4b are drawn to be placed as shown in 4c; and FIGS. 5a and 5b are drawn to be placed as shown in FIG. 5c.

In the embodiment shown in FIG. 2 the command bits 1–8 from the communications controller are stored in the configuration register 57 and used to select one of the baud rates which are used by the subchannel and by the terminal device shown in FIG. 1. For example, command bit 1 selects a baud rate of 110, command bit 2 selects a baud rate of 135, command bit 3 selects a buad rate of 150. Oscillator 63 can be designed to supply signal pulses for the commonly used baud rates and the frequencies from the oscillator can be changed to satisfy customer requirements. The signal pulses supplied by oscillator 63 (FIG. 2) are 16 times the baud rate of the data. For example, when the baud rate is 110 the oscillator provides 1760 timing pulses per second. This high frequency of timing pulses causes one of the pulses to occur very near the time the center of a binary bit is received by the subchannel as is well known in the art. Command bit 9 can be used to select one or two stop bits. Command bits 10–13 can be used to select code levels of 5–8, and command bits 14 and 15 can be used to select either a receive mode or a send mode or both modes for the subchannel.

The gates which are connected to the configuration register shown in FIG. 2 can also be used to develop other signals so that combinations of control signals developed by the code level or by stop bit signals can be used by the subchannel. For example, a signal representing a code level of 8 may be applied to one lead of OR-gate 26 or a signal representing a code level of 7 may be applied to the other input lead of OR-gate 26. Thus, either of these signals will cause OR-gate 26 to provide an output signal so that a code level of either 7 or 8 causes a signal to be applied to output terminal 109. The label "*code* = 7 + 8" on the drawing means that the code level can be either a 7 or an 8.

A SYNC signal or an ASYNC signal from the communications controller accompanied by a $CON signal can be used to cause the flip-flop to provide either a SYNC MODE or an ASYNC MODE signal so that the subchannel will operate in either a synchronous or an asynchronous mode.

When it is desired that the subchannel be configured in a synchronous mode a SYNC signal and a connect or $CON signal are applied to the input terminals of AND-gate 40. The SYNC signal and the $CON signal enable gate 40 so that the mode flip-flop 54 is set thereby providing a binary one or SYNC MODE signal at the Q output lead of flip-flop 54. A signal from the output lead of NAND-gate 40 is also coupled through OR-gate 50 and causes a sync character on command bit lines 1–8 to be leaded into the configuration register 57. This signal from gate 40 also causes command bits 9–13 which contain the code level signals and the stop bit signals to be loaded into register 57 and causes the command bits 14 and 15 to configure the subchannel in the send or the receive mode. The SYNC MODE signal from the Q output lead of flip-flop 54 also causes the comparator 17 to compare the bits of the sync character which are stored in register 57 with the bits in a character which may be received from the modem and which is shifted into receive register 181 shown in FIG. 4. Bit comparator 17 may be a comparator which is well known in the art such as the one shown on pages 325–327 of the textbook "Digital Computer Design Fundamentals" by Yaohan Chu, McGraw-Hill, New York, New York, 1962.

When the subchannel is placed in the send mode the SEND MODE signal from control register 59 is coupled to terminal 108 (FIG. 2) and from there to terminal 108 (FIG. 5) thereby enabling AND-gate 97 and sending a character request signal or CHAR REQ on line 126 to the communications controller. The first character is placed on the data lines from the communication controller which are connected to buffer 169 and a load character pulse or LOAD CHAR is applied on the line 96, thereby gating the data first character into buffer 169. The LOAD CHAR pulse on line 96 also sets flip-flop 98 thereby providing a binary one to the upper lead of AND-gate 151. If there is no character in the shift register comprising flip-flops **175*a*–175*h* the flip-flop 99 will be reset from an initializing signal so that a binary one from the $\overline{Q}$ lead is applied to the other lead of AND-gate 151 causing a load register signal or LOAD REG to be applied to AND-gates 170*a*–170*f* and NAND-gates 172*a*–172*e*. The LOAD REG signal enables these gates causing the character in buffer 169 to be loaded into the shift register 174. The LOAD REG signal from AND-gate 151 is inverted by inverter 153, delayed by delay line 154 and is used to reset flip-flop 98 so that another CHAR REQ is sent to the controller. The LOAD REG signal also sets flip-flop 99**.

When a modem is ready to receive a character from the subchannel a signal from the modem is applied to the C input lead of flip-flop 52 (FIG. **3*a*) thereby setting flip-flop 52 and providing a binary zero at the $\overline{Q}$ output lead. The binary zero is delayed by delay line 53 and applied to the R lead of flip-flop 52 causing flip-flop 52 to be reset. Flip-flop 52 provides a positive pulse at the Q lead, with the duration of the pulse equal to the time delay of delay line 53. The positive pulse from the Q output lead is applied through OR-gate 55 to one lead of NAND-gate 56. The SEND MODE signal from FIG. 2 is applied to terminal 108 which is connected to a second lead of NAND-gate 56 and a character in register or CHAR IN REG signal from the Q output lead of flip-flop 99 (FIG. 5) is applied to terminal 146 and connected to the third lead of NAND-gate 56 (FIG. 3) thereby enabling NAND-gate 56. The output of NAND-gate 56 is applied to the S lead of the send start flip-flop 83 thereby setting flip-flop 83 and providing a binary one at the Q output lead. The binary one from the Q output lead of flip-flop 83 is delayed by delay line 84 for a period greater than the duration of the pulse from flip-flop 52. The pulse from the Q lead of flip-flop 83 and the SYNC MODE signal on terminal 112 are connected to the leads of AND-gate 87, thereby providing a SYNC SEND START signal at output terminal 130. The SYNC SEND START signal is applied to terminal 130 (FIG. 5) so that the binary bit which was stored in flip-flop 175h of shift register 174 is coupled through AND-gate 178 and OR-gate 180 to the lead 79 which is connected to the modem. The SYNC SEND START signal from gate 87 and the next SYNC SEND pulse from the Q output lead of flip-flop 52 are applied to the leads of AND-gate 93 thereby providing a SEND SHIFT pulse through OR-gate 94 to output terminal 128. The SEND SHIFT pulse from output terminal 128 is coupled to the C input lead of shift register 174 (FIG. 5) causing the binary data bits in flip-flops 175*a*–175*h* to shift one position to the right. The binary bits of the character are shifted one at a time by SEND SHIFT pulses into flip-flop 175*h* and coupled through gates 178 and 180 to line 79. Thus, the data characters are shifted one binary bit at a time over line 79** to the modem.

Each of the pulses which is applied to terminal 128 is coupled to the character counter 160 (FIG. **5*a*) thereby causing the count to be incremented by one in counter 160. When the counter 160 produces a count of 8 the decoder 162 develops a SEOC signal which is coupled from the output of decoder 162 through NOR-gate 165. Decoder 162 may be a decoder which is well known in the art. The SEOC signal from NOR-gate 165 is used to reset each of the flip-flops 175*a*–175*h* and 176 in the shift register 174. The SEOC signal is delayed by delay line 166 and applied to the reset lead of flip-flop 99 causing the flip-flop 99 to be reset so that another data character can be loaded into the shift register 174. The signal from delay line 166 is also coupled back to the character counter 160 and is used to reset counter 160. The SEOC signal from delay line 166 is further delayed by delay line 158 and inverted by inverter 167. This delayed and inverted signal is applied to NAND-gates 156 and 157 so that the counter can be preset when a character having fewer than 8 bits is used in the subchannel. For example, when a character having a code level of 7 is used, a signal on the input terminal 124 is applied to NAND-gate 157 so that the counter has a preset value of one. When a 5 level code is used a signal on terminals 123 and 124 is coupled through NAND-gates 156 and 157 to preset the counter to a count of 3. When the counter is preset to a count of 3 only five pulses are required to cause the counter to reach a count of 8 and to provide an output signal from the decoder 162**.

Each time that a LOAD REG signal is applied to gates **170*a*–170*f* and 172*a*–172*e* this signal is inverted by inverter 153, delayed by delay line 154 and used to reset flip-flop 98. When flip-flop 98 is reset a CHAR REQ signal is sent to communications controller on line 126 so that another character is loaded into buffer 169. This continues until the SEND MODE signal is turned off thereby disabling AND-gate 97**.

In order to receive data characters from the terminal device in the synchronous mode the subchannel must be configured with SYNC and $CON signals setting the mode flip-flop 54 (FIG. 2) in the synchronous mode, a sync character must be loaded into the first eight positions of the configuration register 57, a code level must be specified by storing one of the command bits 9-13 in register 57, and command bit 14 must set the control register 59 so that a RECEIVE MODE signal is developed at the output terminal 107.

The modem supplies timing signals on line 70 (FIG. 3) to the C input lead of flip-flop 62 thereby providing a positive voltage at the Q output lead of flip-flop 62. At the same time a binary zero produced at the $\overline{Q}$ output lead of flip-flop 62 is delayed by delay line 66 and applied to the reset lead of flip-flop 62 thereby resetting the flip-flop and providing a narrow positive pulse at the Q output lead of flip-flop 62. The SYNC MODE signal on terminal 112 enables AND-gate 69 so that the timing pulses from flip-flop 62 are coupled through AND-gate 69 and exclusive-OR gate 72 to output terminal 89 where they are coupled to FIG. 4. The timing signals on terminal 89 of FIG. 4 cause the serial data which is received at input lead 80 of the receive register 181 to be shifted into the receive register 181 which comprises a plurality of J K flip-flops. When the subchannel is operating in a synchronous mode the data received on input lead 80 bypasses flip-flops 185 and 189 by being routed through gates 182, 184, 194 and 196 to the input lead of flip-flop 199. When a code level of 8 is used the first binary bit is gated into flip-flop 199 and then through gates 202 and 203 to flip-flop 206. When a code level of 7 is used the binary data from OR-gate 196 is coupled through AND-gate 201 and OR-gate 203 to the flip-flop 206 thereby bypassing flip-flop 199. When a code level of 6 is used the binary bit from the output of OR-gate 196 is coupled through AND-gate 187 and OR-gate 189 to the input lead of flip-flop 191 thereby passing flip-flops 199 and 206. When a code level of 5 is used the binary bit from the output of OR-gate 196 is coupled through AND-gate 208 and OR-gate 210 to the input of flip-flop 213 thereby bypassing flip-flops 199, 206 and 191.

After each timing pulse has been applied to the flip-flops comprising the receive shift register 181, the bit comparator 17 (FIG. 2) compares the contents of the shift register with the sync character which is stored in configuration register 57. When the contents of the configuration register 57 and contents of the receive shift register 181 are identical comparator 17 develops a COMP signal which is applied to inverter 18. Invert 18 inverts the signal and causes the flip-flop 19 to be set thereby producing a binary one at the Q output lead. The binary one from the Q output lead of flip-flop 19 is coupled through OR-gate 23 to terminal 116 which is connected to the input terminal 116 in FIG. 3. This signal on terminal 116 enables AND-gate 91 so that the next output pulse from the flip-flop 62 is gated through gates 69, 91 and 90 to the output terminal 127 which is coupled to terminal 127 in FIG. 4. The pulses from terminal 127 are applied to the receive character counter 223 thus causing the counter to increment a count of one each time a pulse is received.

When a total of eight pulses has been received by counter 223 decoder 224 provides an REOC signal which is coupled through NOR-gate 228 and delay line 229 to the reset leads of counter 223. The REOC signal resets counter 223 so that the value of the signal from gate 228 drops causing the REOC signal to be a pulse. This REOC pulse is inverted by inverter 227 and is coupled to terminal 114 (FIG. 2) and applied to one lead of NAND-gate 20. At this time, if another sync character is in the receive register 181 (FIG. 4) bit comparator 17 provides a signal to NAND-gate 20. Since flip-flop 19 had been previously set, gate 20 is enabled so that flip-flop 22 is set thereby providing a SYNC RECOG signal at the Q output lead and at terminal 117. The SYNC RECOG signal at terminal 117 (FIG. 4b) and the delayed REOC pulse enable AND-gate 231 so that flip-flop 236 is set thereby providing a STORE REQ signal to the controller. The delayed REOC pulse also causes the contents of the receive shift register 181 to be loaded into the receive buffer 234. The contents of receive buffer 234 are coupled over the cable 81 to the communications controller. The delayed REOC from delay line 229 is coupled through delay line 221 and inverter 222 to NAND-gates 219 and 220 to enable gates 219 and 220. Signals on terminals 123 and 124 may be used to preset counter to a count of 1, 2 or 3 for code levels of 7, 6 and 5 respectively as described above. For a code level of 8 the counter is reset to zero. As subsequent non-sync or message characters are received, the bit comparator 17 will provide a low value of voltage to inverter 18 (FIG. 2) so that NAND-gate 21 will be enabled and the REOC pulse will reset flip-flop 19.

When the subchannel 1 is used in the asynchronous mode each of the data characters has a binary zero as a start bit and has one or two binary ones as stop bits. When the subchannel is configured in the asynchronous mode a $CON pulse and an ASYNC signal from the communications controller enable NAND-gate 39 (FIG. 2) so that the mode flip-flop 54 (FIG. 2) is reset thereby providing a binary one at the $\overline{Q}$ output lead. At the same time, the communications controller provides one of the command bits 1–8 to the configuration register 57 to select a baud rate which will be used in transferring data characters between the subchannel and a terminal device. The controller also provides signals on command bits 9–15 to select the code level, to select the receive or the send mode, and to choose one or two stop bits as was described in the synchronous mode operation. Command bits 1-8 are used to enable one of the gates 13a–13h thereby selecting signal pulses at one of the frequencies from oscillator 63. These pulses are coupled through OR-gate 16 to the C input lead of flip-flop 36. Each of the pulses from the oscillator 63 causes flip-flop 36 to be set thereby providing a binary zero at the $\overline{Q}$ output lead of flip-flop 36. This binary zero is delayed by delay line 37 and applied to the reset lead of flip-flop 36, thereby causing flip-flop to be reset and providing a narrow output pulse at the Q output lead of flip-flop 36. These pulses from the Q output lead of flip-flop 36 are coupled through AND-gate 68 when the subchannel is in the asynchronous mode and provide asynchronous baud timing signals to output terminal 118. When the subchannel is configured in the send mode the SEND MODE signal on terminal 108 enables AND-gate 97 (FIG. 5) which causes a CHAR REQ to be sent to the controller and causes the controller to return a LOAD CHAR signal which loads buffer 169 as described in the asynchronous operation procedure.

The character in buffer 169 is loaded into shift register 174 as previously described. When a 5, 6 or 7-level code is used in the subchannel, signals from terminals 105, 123 and 125 may be used to provide a binary one to any of the flip-flops 175a–175c which do not receive binary bits from the buffer 169. When an 8-level code is used the buffer 169 contains eight binary bits so that these eight binary bits are transferred to shift register 174. The binary bits supplied by signals on terminals 105, 123 and 125 are stop bits when a code level of 5, 6 or 7 is used. It should be noted that binary bits are not loaded from buffer 169 into flip-flop 176 in the shift register 174. This flip-flop 176 contains the start bit for the character. This start bit is supplied to flip-flop 176 each time the shift register is reset and is supplied in the form of a binary zero. The ASYNC BAUD timing pulses from terminal 118 (FIG. 2) are coupled to terminal 118 of FIG. 3 through gates 55 and 56 to the S lead of send start flip-flop 83. These pulses set flip-flop 83 so that a binary one is developed at the Q output lead of flip-flop 83. The binary one at the Q output lead of flip-flop 83 is coupled through delay line 84 and AND-gate 88 to the terminal 131. This ASYNC SEND start signal on terminal 131, (FIG. 5) enables AND-gate 179 so that the start bit from flip-flop 176 is coupled through gates 179 and 180 to line 79 which is coupled to the modem. The ASYNC SEND signal also enables gate 92 (FIG. 3) so that the next timing pulse from terminal 118 which is applied to the lower lead of gate 92 is coupled through to the send bit counter 96 thereby causing the counter 96 to increment its count by one.

Each pulse increments the count in the send bit counter by one until a count of 15 is reached at which time the decoder provides a signal which is coupled through OR-gate 94 thereby providing a SEND SHIFT signal to terminal 128. The SEND SHIFT signal on terminal 128 (FIG. 5) causes each of the bits in register 174 to be shifted one position to the right so that the next binary bit is shifted through gates 170 and 180 to lead 79 which is coupled to the modem. This SEND SHIFT signal also causes the send character counter 160 to be incremented by a count of one. Pulses which are subsequently applied to the send bit counter 95 cause the counter to go to zero and then subsequently to a count of 15. When the count of 15 is reached another signal is developed by decoder 95 and is coupled through gate 94 to terminal 128 (FIG. 5) and causes the binary bits in shift register 174 to be shifted one position to the right so that the next binary bit is coupled through gates 179 and 180 to the modem. The SEND SHIFT signal from gate 128 also causes the send character counter to be incremented by one. This action continues until a count of ten or twelve is present in the send character counter 160. If a one stop bit is used in the character a count of 10 causes the decoder 163 to develop an SEOC pulse which is coupled through OR-gate 165 to delay line 166. The SEOC pulse is coupled through inverter 167, delay line 158 and used to preset counter 160 as described above. The SEOC pulse also resets or clears the shift register 174 as described above.

Subsequent characters from the controller are loaded onto buffer 169, into shift register 174 and are shifted a bit at a time over line 79 to the modem. This continues until the entire message has been transferred from the controller to the modem.

When it is desired that the subchannel be configured in the asynchronous receive mode the ASYNC signal and the $CON signal (FIG. 2) reset the mode flip-flop 54 so that an ASYNC MODE signal is available at the $\bar{Q}$ output lead. One of the command bits 1–8 sets the configuration register to the desired baud rate. Command bits 9–13 select one or two stop bits and a code level and the RECEIVE MODE signal is developed by control register 59 in response to command bit 14. In the asynchronous mode synchronization occurs on the start bit of each character which is a binary zero. The start bit from the modem applied to the S lead of flip-flop 61 (FIG. 3) sets flip-flop 61 so that a binary one is developed at the Q output lead and is applied to AND-gate 67 and to the R lead of receive bit counter 74. The binary one on the R leads of counter 160 allows the counter to count the SEND SHIFT pulses received. The binary one from flip-flop 61 and the ASYNC SHIFT pulses received. The binary one from flip-flop 61 and the ASYNC MODE signal enable gate 67 so that the async baud pulses from terminal 118 are coupled through gate 67 and increment the receive bit counter 74 each time a pulse is received. When the receive bit counter reaches a count of 8 the signal from counter 74 is decoded by the decode matrix 75 thereby providing a timing signal so that the NAND-gate 43 is enabled. The binary zero from the modem is inverted by inverter 42 and gated through NAND-gate 43 to the S lead of the valid start flip-flop 49, thereby setting flip-flop 49. The signal from decode matrix 75 is coupled through exclusive OR-gate 72 to the output terminal 89 and is coupled to terminal 89 on FIG. 4. These timing signals on terminal 89 cause the start bit from the modem to be gated into the RS9 flip-flop 185 in the receive register 181 (FIG. 4).

The signals from the decode matrix 75 in FIG. 3 are coupled through OR-gate 90 to the output terminal 127, from terminal 127 on FIG. 4 to the receive character counter 223 thereby incrementing the counter 223. The async baud pulses on terminal 118 of FIG. 3 continue to increment the count in the receive bit counter 74 so that the count goes to 15, to zero and back to a count of eight. When the count reaches 8 another pulse from decoder matrix 75 causes the binary start bit in receive register 181 (FIG. 4) to be shifted from flip-flop 185 to the RS8 flip-flop 193 and causes the first data bit to be shifted into the RS9 flip-flop 185. Each succeeding pulse from the decode matrix 75 causes the binary bits to be shifted through the receive register until the binary start bit is placed in the flip-flop 217 of the receive register 181. The next pulse shifts the binary start bit out of the flip-flop 217 so that it is lost and is stripped from the asynchronous character. The character in the receive register 181 is then loaded into the receive buffer by the REOC pulse from the receive character counter 88 as described above. The REOC signal on terminal 114 (FIG. 4) is coupled to terminal 114 (FIG. 3) and resets the async start flip-flop 61 and the valid start flip-flop 49. When flip-flop 61 is reset the binary zero from the Q output lead also causes the receive bit counter 74 to be reset to a value of zero.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. In a data communication system having a modem, a subchannel and a communication controller, said subchannel comprising:

a shift register having a plurality of stages to store a character having a plurality of data bits;

a receive buffer having a plurality of stages to store a character having a plurality of data bits, said receive register being connected between said modem and said buffer, said buffer being coupled to said controller;

means for checking the duration of a start bit of a character, said means providing timing pulses when a predetermined duration of start bits has been received by said means, said means being coupled to said receive register, each of said timing pulses causing a binary bit to be shifted from said modem into said receive register;

a counter, said counter being connected between said means and said buffer, said counter providing an end of character signal when a complete character has been loaded into said receiver register, said end of character signal causing a character to be loaded into said buffer; and means for using said end of character signal to preset said counter to a predetermined count so that shortened characters can be loaded into said receive register, said means for using being connected to said counter.

2. In a data communication system having a modem, a subchannel and a communications controller, said subchannel comprising:

a receive shift register having a plurality of flip-flops to store a character having a plurality of data bits;

a receive buffer having a plurality of stages to store a character having a plurality of data bits, said receive register being connected between said modem and said buffer, said buffer being coupled to the controller;

means for selectively bypassing selected flip-flops in said shift register when characters having fewer than a predetermined number of bits are received from said modem, said means for bypassing being coupled to said receive register;

a counter, said counter being coupled to said modem, said counter providing an end of character signal when a complete character has been shifted into said shift register, said counter being connected to said buffer, said end of character signal causing a character to be loaded into said buffer; and means for using said end of character signal to preset said counter to a predetermined count so that shortened characters can be loaded into said receive register, said means for using being connected to said counter.

3. In a data communication system having a modem, a subchannel and a communications controller, said subchannel comprising:

a receive shift register;

a receive buffer, said receive register being connected between said modem and said buffer, said buffer being coupled to said controller;

a configuration register;

a bit comparator, said configuration register being connected between said controller and said comparator, said controller supplying a sync character to said configuration register, said comparator developing a compare signal when a character in said receive register is identical to a sync character in said configuration register; and a counter, said counter being connected between said comparator and said buffer, said counter developing a recognize signal when it receives two compare signals, said recognize signal causing a character from said receive register to be loaded into said buffer.

4. In a data communications system having a modem, a subchannel and a communications controller, said subchannel comprising:

a receive shift register having a plurality of stages to store a character having a plurality of data bits;

a receive buffer having a plurality of stages to store a character having a plurality of data bits, said receive register being connected between said modem and said buffer, said buffer being coupled to said controller;

means for checking the duration of a start bit of a character, said means providing timing pulses when a predetermined duration of start bit has been received by said means, said means being coupled to said receive register, each of said timing pulses causing a binary bit to be shifted from said modem into said receive register;

a counter, said counter being connected between said means and said buffer, said counter providing an end of character signal when a complete character has been loaded into said receive register, said end of character signal causing a character to be loaded into said buffer.

5. In a data communications system having a modem, a subchannel and a communications controller, said subchannel comprising:

a receive shift register having a plurality of flip-flops to store a character having a plurality of data bits;

a receive buffer having a plurality of stages to store a character having a plurality of data bits, said receive register being connected between said modem and said buffer, said buffer being coupled to said controller; and means for selectively bypassing selected flip-flops in said shift register when characters having fewer than a predetermined number of bits are received from said modem, said means for bypassing being coupled to said receive register.

6. A subchannel as defined in claim 5 including:

a counter, said counter being coupled to said modem, said counter providing an end of character signal when a complete character has been shifted into said shift register, said counter being connected to said buffer, said end of character signal causing a character to be loaded into said buffer.

* * * * *